US012579556B2

(12) United States Patent
Agarwal et al.

(10) Patent No.: US 12,579,556 B2
(45) Date of Patent: *Mar. 17, 2026

(54) SYSTEMS AND METHODS FOR PROVIDING CONTENT ITEMS VIA A PUSH MARKETING AUCTION

(71) Applicant: GOOGLE LLC, Mountain View, CA (US)

(72) Inventors: Amit Agarwal, Mountain View, CA (US); Surojit Chatterjee, Los Altos, CA (US); Gaurav Bhaya, Mountain View, CA (US); Anshul Kothari, Mountain View, CA (US); Vibhor Nanavati, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,365

(22) Filed: Jun. 6, 2024

(65) Prior Publication Data

US 2024/0320713 A1 Sep. 26, 2024

Related U.S. Application Data

(63) Continuation of application No. 17/139,728, filed on Dec. 31, 2020, now Pat. No. 12,026,752, which is a (Continued)

(51) Int. Cl.
*G06Q 30/00* (2023.01)
*G06Q 30/0251* (2023.01)
(Continued)

(52) U.S. Cl.
CPC ..... *G06Q 30/0275* (2013.01); *G06Q 30/0252* (2013.01); *G06Q 30/0261* (2013.01); *H04L 67/55* (2022.05)

(58) Field of Classification Search
CPC ........... G06Q 30/0275; G06Q 30/0252; G06Q 30/0261; H04L 67/55
(Continued)

(56) References Cited

U.S. PATENT DOCUMENTS 7,636,574 B2 12/2009 Poosala
8,352,980 B2 1/2013 Howcroft
(Continued)

FOREIGN PATENT DOCUMENTS

CN 104838662 A 8/2015
EP 2 541 474 1/2013
(Continued)

OTHER PUBLICATIONS

R. Kambalakatta, M. Kumar and S. K. Das, "Profile based caching to enhance data availability in push/pull mobile environments," The First Annual International Conference on Mobile and Ubiquitous Sys: Networking and Services, 2004. MOBIQUITOUS 2004., Boston, MA, USA, 2004, pp. 74-83, doi: 10.1109/MO (Year: 2004).*
(Continued)

*Primary Examiner* — Sun M Li
(74) *Attorney, Agent, or Firm* — MARSHALL, GERSTEIN & BORUN LLP

(57) ABSTRACT

The present disclosure is directed to systems and methods of providing content. A server can generate a request for a push content item for an account identifier linked with a computing device. The server can establish a push auction for the account identifier with multiple candidate push content items. The server can determine an auction score for each candidate push content item and select a push content item therefrom based on the auction score. The server can determine a parameter for the account identifier and control delivery of the selected push content item based on a delivery control policy. The server can compare a value of (Continued)

the parameter with a threshold value to authorize the push content item. The server can provide the selected and authorized push content item for presentation in a push content slot via the computing device linked to the account identifier.

18 Claims, 5 Drawing Sheets

Related U.S. Application Data continuation of application No. 14/939,591, filed on Nov. 12, 2015, now abandoned.

(60) Provisional application No. 62/216,138, filed on Sep. 9, 2015.

(51) Int. Cl.
*G06Q 30/0273* (2023.01)
*H04L 67/55* (2022.01)

(58) Field of Classification Search
USPC ...................................................... 705/14.71
See application file for complete search history.

(56) References Cited

U.S. PATENT DOCUMENTS

| | | | |
|---|---|---|---|
| 8,364,810 B2 | 1/2013 | Rudenko et al. | |
| 9,117,227 B1 * | 8/2015 | Agrawal | G06Q 30/0242 |
| 9,531,827 B1 | 12/2016 | Onnen et al. | |
| 10,110,541 B2 | 10/2018 | Li | |
| 10,248,667 B1 | 4/2019 | Agrawal et al. | |
| 10,282,165 B2 | 5/2019 | Bostick et al. | |
| 10,785,286 B2 | 9/2020 | Gu et al. | |
| 2007/0005188 A1 * | 1/2007 | Johnson | G06F 16/444 |
| | | | 455/456.3 |
| 2007/0244750 A1 | 10/2007 | Grannan et al. | |
| 2008/0192820 A1 | 8/2008 | Brooks et al. | |
| 2008/0243619 A1 | 10/2008 | Sharman et al. | |
| 2009/0309711 A1 | 12/2009 | Adappa et al. | |
| 2010/0023475 A1 | 1/2010 | Lahav | |
| 2010/0262449 A1 * | 10/2010 | Monteforte | H04W 4/029 |
| | | | 705/14.66 |
| 2011/0040848 A1 * | 2/2011 | Xu | H04L 67/60 |
| | | | 707/E17.014 |
| 2012/0239507 A1 * | 9/2012 | Braginsky | G06Q 10/10 |
| | | | 709/224 |
| 2013/0185355 A1 | 7/2013 | Tseng et al. | |
| 2013/0281124 A1 | 10/2013 | Laumen et al. | |
| 2015/0100423 A1 * | 4/2015 | Oldham | G06Q 30/0256 |
| | | | 705/14.54 |
| 2016/0226989 A1 * | 8/2016 | Ovsiankin | G06Q 30/0243 |
| 2017/0061462 A1 * | 3/2017 | Bhalgat | G06Q 30/0275 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0324807 A1 * | 11/2017 | Gu | H04L 67/561 |
| 2017/0358301 A1 | 12/2017 | Raitio et al. | |
| 2018/0183651 A1 | 6/2018 | Liu | |
| 2018/0270520 A1 | 9/2018 | Ott et al. | |
| 2021/0224847 A1 * | 7/2021 | Fox | G06Q 50/01 |

FOREIGN PATENT DOCUMENTS

| | | |
|---|---|---|
| WO | WO-2008/052356 A1 | 5/2008 |
| WO | WO-2009/010633 A1 | 1/2009 |
| WO | WO-2009/146250 A1 | 12/2009 |

OTHER PUBLICATIONS

R. Cohen, L. Katzir and D. Raz, "Scheduling algorithms for a cache pre-filling content distribution network," Proceedings. Twenty-First Annual Joint Conference of the IEEE Computer and Communica-
tions Societies, New York, NY, USA, 2002, pp. 940-949 vol. 2, doi: 10.1109/INFCOM.2002.1019341. (Year: 2002).*
S. Buckley et al., "Social media and customer behavior analytics for personalized customer engagements," in IBM Journal of Research and Development, vol. 58, No. 5/6, pp. 7:1-7:12, Sep.-Nov. 2014, doi: 10.1147/JRD.2014.2344515. (Year: 2014) (Year: 2014).*
Systems and Methods for Social Sharing of Suggested Content Items, An IP.com Prior Art Database Technical Disclosure, Authors et. al.: Justin Lewis, IP.com No. IPCOM000251284D IP.com Electronic Publication Date: Oct. 29, 2017 (Year: 2017) (Year: 2017).*
"Dolphin' attacks fool Amazon, Google voice assistants", BBC News, Sep. 7, 2017 (8 pages).
"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
"Google Assistant SDK", Google Developers Newsletter, Google Developers, developers.google.com, accessed on Jul. 12, 2017 (2 pages).
"Products Feed Specification", Google Merchant Center Help, Google, Inc., retrieved Mar. 18, 2013 from URL: http://www.support.google.com/merchants/bin/answer.py?hl=en&answer=188494#US <http://www.support.google.com/merchants/bin/answer.py?hl=en&answer=188494> (6 pages).
"Supported File Formats", Google Merchant Center Help, Google, Inc., retrieved Mar. 18, 2013 from URL: <http://www.support.google.com/merchants/bin/answer.py?hl=en&answer=160567> (1 page).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).
Amazon, "Echo Look I Hands-Free Camera and Style Assistant", retrieved Aug. 22, 2017 from URL: <https://www.amazon.com/gp/product/B0186JAEWK?ref%5F=cm%5Fsw%5Fr%5Ffa%5Fdp%5Ft2%5F>C5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Before the Patent Trial and Appeal Board for U.S. Appl. No. 14/939,591, dated Nov. 3, 2020.
Broussard, Mitchel, "Chatbot-Like Siri Patent Includes Intelligent Image, Video, and Audio Recognition Within Messages", Mac Rumors, May 11, 2017, retrieved Jul. 12, 2017 from URL: <https://www.macrumors.com/2017/05/11/siri-chatbot-like-patent/> (11 pages).
Buckland et al., "Amazon's Alexa Takes Open-Source Route to Beat Google Into Cars", Bloomberg, Feb. 27, 2018 (6 pages).
Buckley et al., "Social media and customer behavior analytics for personalized customer engagements," in IBM Journal of Research and Development, vol. 58, No. 5/6, pp. 7:1-7:12, Sep.-Nov. 2014, doi: 10.1147/JRD.2014.2344515. (Year: 2014).
Chen, Lulu Yilun, "Alibaba Challenges Google, Amazon With New Echo-Like Device", Bloomberg, Jul. 5, 2017, retrieved Jul. 12, 2017 from URL: <https://www.bloomberg.com/news/articles/2017-07-05/alibaba-challenges-google-amazon-with-new-echo-like-device> (3 pages).
Close, Kerry, "Amazon Echo Will Give You These Deals If You Order Through Alexa This Weekend," Time.com <http://Time.com>, Nov. 18, 2016 (2 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Cohen et al., "Leveraging Web services for information discovery," Proceedings 2003 Symposium on Security and Privacy, Herzlia, Israel, 2003, pp. 123-132, doi: 10.1109/SWSTE.2003.1245432. (Year: 2003).

(56) References Cited

OTHER PUBLICATIONS

Collins, et al., "Can Twitter Save Itself?", CNET, Apr. 26, 2017, retrieved Aug. 22, 2017 from URL: <https://www.cnet.com/news/twitter-q1-2017-earnings/> (3 pages).
Cook, John, "A Siri for advertising: These mobile ads talk back to you," GeekWire, Apr. 1, 2013, geekwire.com<http://geekwire.com> (7 pages).
Crist, Ry, "Logitech Harmony's Alexa skill just got a whole lot better", CNET, Jul. 13, 2017 (2 pages).
Estes, Adam Clark, "Amazon's Newest Gadget Is a Tablet That's Also an Echo", Gizmodo, Sep. 19, 2017 (3 pages).
Examination Report for EP Appin. Ser. No. 16770129.1 dated Feb. 6, 2020 (9 pages).
Final Office Action for U.S. Appl. No. 15/815,398 dated Jan. 6, 2020 (15 pages).
Final Office Action for U.S. Appl. No. 15/815,398, dated Aug. 23, 2021.
Final Office Action for U.S. Appl. No. 15/815,398, dated Aug. 31, 2022.
Final Office Action for U.S. Appl. No. 14/939,591 dated Aug. 14, 2018 (18 pages).
First Office Action for CN Appin. Ser. No. 201680027372.0 dated Jul. 28, 2020 (17 pages).
Forrest, Conner, Essential Home wants to be 'bridge' between Amazon Alexa, Apple's Siri, and.
Foxx, Chris, "Apple reveals HomePod smart speaker", BBC, Jun. 5, 2017 (9 pages) C27 2017 (6 pages).
Gebhart, Andrew, "Google Assistant is spreading, but it needs its own Echo Dot", cnet, May 20, 2017 (7 pages).
Gebhart, Andrew, Google Home to the Amazon Echo: 'Anything you can do . . . —, CNET, May 18.
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Gurman et al., "Apple Is Manufacturing a Siri Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Preliminary Report on Patentability for PCT Appin. Ser. No. PCT/US2016/050531 dated Mar. 22, 2018 (8 pages).
International Search Report and Written Opinion for PCT Appin. Ser. No. PCT/US2016/050531 dated Dec. 19, 2016 (12 pages).
Johnston, Lisa, "Amazon Whirlwind: New Echo, Plus, Spot, Connect, Fire TV Take the Stage", Twice, Sep. 27, 2017 (10 pages).
Kambalakatta et al., "Profile based caching to enhance data availability in push/pull mobile environments," The First Annual International Conf on Mobile and Ubiquitous Systems: Networking and Services, 2004. Mobiquitous 2004., Boston, MA, USA, 2004, pp. 74-83, doi: 10.1109/MO (Year: 2004).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (3 pages).
Kridel et al., "Adaptive Modeling for Real Time Analytics: The Case of "Big Data" in Mobile Advertising," 2015 48th Hawaii International Conference on System Sciences, 2015, pp. 887-896, doi: 10.1109/HICSS.2015.111. Date of Conference: Jan. 5-8, 2015, (Year: 2015).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).

Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC, May 18, 2017 (11 pages).
Lund, Pamela, "Mastering Google Product Feeds and Product Listing Ads—Part 1", BlueGlass, Dec. 28, 2013, retrieved from URL: http://www.blueglass.com/blog/mastering-google-product-feeds-and-product-listing-ads-part-1/#comments, Dec. 28, 2013 (17 pages).
McNamara et al., "Content Source Selection in Bluetooth Networks," 2007 Fourth Annual International Conference on Mobile and Ubiquitous Systems: Networking & Services (MobiQuitous), Philadelphia, PA, USA, 2007, pp. 1-8, doi: 10.1109/MOBIQ.2007.4451000. (Year: 2007).
Nieva, Richard, "Google Home and eBay can tell you how much that's worth", CNET, Mar. 8, 2017 (3 pages).
Non-Final Office Action for U.S. Appl. No. 14/939,591 dated Mar. 14, 2018 (13 pages).
Non-Final Office Action for U.S. Appl. No. 15/815,398, dated Feb. 16, 2023.
Non-Final Office Action for U.S. Appl. No. 15/815,398 dated Apr. 8, 2021 (23 pages).
Non-Final Office Action for U.S. Appl. No. 15/815,398 dated Aug. 20, 2019 (13 pages).
Non-Final Office Action for U.S. Appl. No. 15/815,398 dated May 15, 2020 (18 pages).
Non-Final Office Action for U.S. Appl. No. 15/815,398 dated Nov. 20, 2020 (23 pages).
Non-Final Office Action for U.S. Appl. No. 15/815,398, dated Feb. 7, 2022.
Notice of Allowance for Chinese Application No. 201680027372.0, dated Mar. 8, 2021.
Novet, et al., "Amazon is getting ready to bring Alexa to work", CNBC, Nov. 29, 2017 (4 pages).
Oral Proceedings for European Application No. 16770129.1, dated Oct. 5, 2020.
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", TechCrunch, Jun. 15, 2017 (8 pages).
Porter, Jon, "Amazon Echo Show release date, price, news and features", TechRadar, Jun. 26, 2017 (11 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Record of Oral Hearing Before the Patent Trial and Appeal Board for U.S. Appl. No. 14/939,591, dated Oct. 22, 2020.
Sablich, Justin, "Planning a Trip With the Help of Google Home", New York Times, dated May 31.
Second Office Action for CN Appin. Ser. No. 201680027372.0 dated Dec. 17, 2020 (6 pages).
Seifert, Dan, "Samsung's new virtual assistant will make using your phone easier", The Verge, Mar. 20, 2017 (6 pages).

(56) References Cited

OTHER PUBLICATIONS

Sherr, lan, "IBM built a voice assistant for cybersecurity", CNET, Feb. 13, 2017 (9 pages).

Siegal, Daniel, "IP Attys Load Up Apps' Legal Challenges At 'Silicon Beach'", Law360, Los Angeles, California, Feb. 2, 2017 (4 pages).

Simonite, Tom, "How Alexa, Siri, and Google Assistant Will Make Money Off You," Technology Review, May 31, 2016, technologyreview.com (9 pages).

Simonite, Tom, "How Assistant Could End Up Eating Google's Lunch," Technology Review, Sep. 23, 2016, technologyreview.com (8 pages).

Smith, Dave, "The Amazon Echo got 2 incredibly useful features thanks to a new update", Business Insider, Jun. 1, 2017 (2 pages).

Systems and Methods for Social Sharing of Suggested Content Items, An IP.com Prior Art Database Technical Disclosure, Authors et. al.: Justin Lewis, IP.com No. IPCOM000251284D IP.com Electronic Publication Date: Oct. 29, 2017 (Year: 2017).

Willens, Max, "For publishers, Amazon Alexa holds promise but not much money (yet)", Digiday, Jul. 6, 2017 (5 pages).

Wirtz et al., "Pervasive content-centric wireless networking," Proceeding of IEEE International Symposium on a World of Wireless, Mobile and Multimedia Networks 2014, Sydney, NSW, Australia, 2014, pp. 1-9, doi: 10.1109/ WoWMoM.2014.6918968. (Year: 2014).

Yom-Tov et al., "Measuring inter-site engagement," 2013 IEEE International Conference on Big Data, Silicon Valley, CA, USA, 2013, pp. 228-236, doi: 10.1109/BigData.2013.6691579. (Year: 2013).

* cited by examiner

200

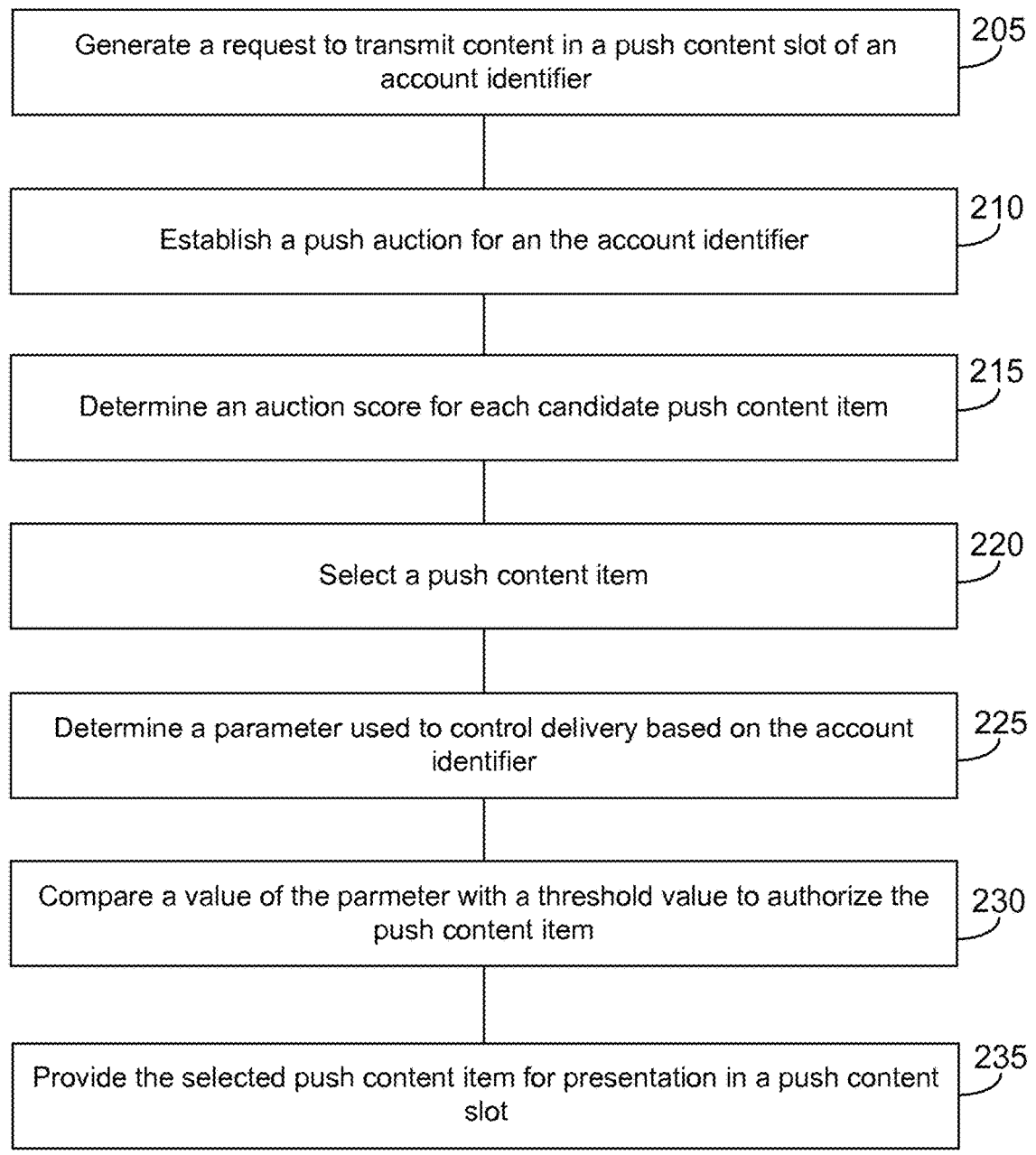

Generate a request to transmit content in a push content slot of an account identifier — 205

Establish a push auction for an the account identifier — 210

Determine an auction score for each candidate push content item — 215

Select a push content item — 220

Determine a parameter used to control delivery based on the account identifier — 225

Compare a value of the parmeter with a threshold value to authorize the push content item — 230

Provide the selected push content item for presentation in a push content slot — 235

FIG. 2

SYSTEMS AND METHODS FOR PROVIDING CONTENT ITEMS VIA A PUSH MARKETING AUCTION

CROSS-REFERENCES TO RELATED APPLICATIONS

This application is a continuation of U.S. patent application Ser. No. 17/139,728, filed Dec. 31, 2020, which is a continuation of U.S. patent application Ser. No. 14/939,591, filed Nov. 12, 2015, which claims priority to U.S. Provisional Patent Application No. 62/216,138, filed on Sep. 9, 2015, each of which are hereby incorporated by reference herein in their entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

The present disclosure is generally directed to systems and methods for providing content items using a push marketing auction. Consumers are generally sensitive to receiving push content (such as SMS, text, notifications) on their computing devices. For example, sending push content items to a mobile computing device can drain the mobile computing device's battery, utilize the mobile computing device's limited processing resources (e.g., processor or memory), occupy limited screen space on an electronic display, utilize limited network bandwidth or limited network data allocation. Thus, advertisers that are able to send push content to consumer devices may be careful about the quantity and relevancy of push content items the advertisers can send as well as the content that they are sending as consumers may opt-out from receiving such push content items if the consumers are put off by either the quantity or relevancy of the push content items, or if consumers determine that the battery drain, computing resource drain, or bandwidth utilization is not justified by the relevancy of the push content items. As such, even though an advertiser may choose to send as many push content items as they like, advertisers limit the number of push content items they send to a consumer to avoid having the consumer opt-out from receiving any notifications from the advertiser. As a result, there is a limited supply of push content opportunities that advertisers can avail.

In contrast with online advertising in response to receiving a request for content from a consumer device, the present disclosure relates to sending push content independent of receiving a request for content. The present disclosure can determine, for an account identifier of a consumer, a type of push content item to create and a time at which to transmit the push content item. The present disclosure describes a data processing system that may select a type of push content item and a time at which to transmit the push content item based on historical consumer interactions with push content items. For instance, the data processing system can determine to send a text message at 9:04 am every morning in response to determining that the consumer has a 90% click through rate on links included in the text messages sent between 9:00 am and 9:10 am.

More generally, the present solution can (1) identify, create or generate a push content slot based on historical information associated with an account identifier (e.g., an optimal number of messages per account identifier or an optimal time when a user views messages); (2) determine that a likelihood of engagement or interaction with a push content item presented in the push content slot (e.g., based on time, location, account profile information, type of communication channel or mode of communication, activity, device type, etc.) is greater than a predetermined threshold value; and (3) initiate an online push marketing auction that allows advertisers to bid to serve an advertisement in the push content slot. Thus, the present solution can conserve a device battery, computing resources, screen space, network data usage, or bandwidth by not sending indiscriminate push notifications or push content items.

At least one aspect is directed to a method of providing content items via a computer network. The method can be performed or configured on a data processing system comprising one or more processors and memory. The data processing system can include or be configured with a push trigger, content selector or delivery control agent. In some implementations, the method includes the push trigger generating a request to transmit content for presentation in a push content slot. The content can be presented in the push content slot via a client device linked to an account identifier. The method can include the content selector establishing a push auction to select content for insertion in the push content slot for presentation on the client device of the account identifier. The content selector can establish the push auction responsive to the request generated by the push trigger. The push auction can include multiple candidate push content items for the push content slot. The method can include the content selector determining an auction score for each candidate push content item of the multiple candidate push content items using a likelihood of engagement of the candidate push content item. The method can include the content selector selecting, via the push auction, a push content item from the multiple candidate push content items based on the auction score for each candidate push content item. The method can include the delivery control agent determining, based on the account identifier, a parameter used to control delivery of the selected push content item to the computing device of the account identifier. The method can include the delivery control agent comparing a value of the determined parameter with a threshold value to authorize the selected push content item for presentation in the push content slot. The method can include the delivery control agent providing the selected push content item for presentation in the push content slot via the computing device linked to the account identifier. The delivery control agent can provide the selected push content responsive to authorizing the selected push content item based on the comparison. Thus, the delivery control agent can conserve the battery or power source of a computing device, computing resources of the computing device, screen space, network data usage, or network bandwidth by control which push content items are approved or authorized for delivery, thereby not sending or reducing the amount of indiscriminate push content items that are sent.

The push trigger can generate the request to transmit content for the account identifier based on a predetermined time interval. For example, the push trigger can generate the request every minute, hourly, daily, etc. In some cases, the push trigger generates the request based on a time interval set that is specific to an account identifier. For example, the push trigger can trigger push content auctions on an hourly basis for a first account identifier, while triggering auctions for a second account identifier on a minute-by-minute basis. In some cases, the push trigger can generate the request to transmit content for the account identifier responsive to an instruction from a content provider provided via a content campaign comprising at least one of the plurality of candidate content items.

The content selector can determine the likelihood of engagement based on historical content engagement activity of the account identifier. The content selector can determine a time stamp corresponding to establishing the push auction. The content selector can retrieve, by performing a lookup with the time stamp in an engagement data structure of the account identifier, the likelihood of engagement based on the time stamp. The method can include transforming historical network activity data for the account identifier to a model useful for generating the likelihood of engagement.

In some cases, the content selector can determine the auction score for each candidate push content item of the plurality of candidate push content items based on a base bid and a bid modifier corresponding to the candidate push content item. The delivery control agent can retrieve, from a policy database, the parameter based on a historical model associated with the account identifier. The delivery control agent can retrieve, from a database in memory, a delivery control policy specifying a time window indicating a first time and a second time during which push content is authorized for the account identifier. The delivery control agent can authorize the selected push content item responsive to a comparison of a time stamp corresponding to the request generated by the push trigger and the time window. The delivery control agent can provide the selected push content item for presentation responsive to the authorization.

The delivery control agent can determine, from a policy database, a first number of push content items previously provided for presentation. The first number of push content items may have been provided for presentation via one or more computing devices linked to the account identifier during a predetermined time interval. The delivery control agent can determine, from the policy database, a maximum number of push content items authorized for delivery to the account identifier during the predetermined time interval. The delivery control agent can authorize, for presentation via the computing device, the selected push content item based on the first number being less than the maximum number of push content items determined from the policy database. Thus, the present solution can conserve a device battery, computing resources, screen space, network data usage, or bandwidth by not sending too many (e.g., beyond a maximum number threshold) push content items.

Another aspect is directed to a system to provide content items via a computer network. The system can include a data processing system that includes one or more processors and memory. The data processing system can include, be configured with, or execute, via the one or more processors, a push trigger, content selector, or delivery control agent. The push trigger can generate a request to transmit content for presentation in a push content slot via a client device linked to an account identifier. The content selector can establish a push auction with a plurality of candidate push content items for the push content slot of the account identifier. The content selector can establish the push auction responsive to the request generated by the push trigger, for the account identifier. The content selector can determine an auction score for each candidate push content item of the plurality of candidate push content items using a likelihood of engagement of the candidate push content item. The content selector can select, via the push auction, a push content item from the plurality of candidate push content items based on the auction score for each candidate push content item. The delivery control agent can determine, based on the account identifier, a parameter used to control delivery of the selected push content item to the computing device of the account identifier. The delivery control agent can compare a value of the determined parameter with a threshold value. Based on the comparison, the delivery control agent can authorize the selected push content item for presentation in the push content slot via the computing device linked to the account identifier. The delivery control agent can provide the selected push content item for presentation in the push content slot via the computing device linked to the account identifier. The delivery control agent can provide the selected push content item responsive to authorizing the selected push content item based on the comparison.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 2 depicts a method for providing content items via a push marketing auction in accordance with an implementation.

Like reference numbers and designations in the various drawings indicate like elements.

DETAILED DESCRIPTION

Figure 1:
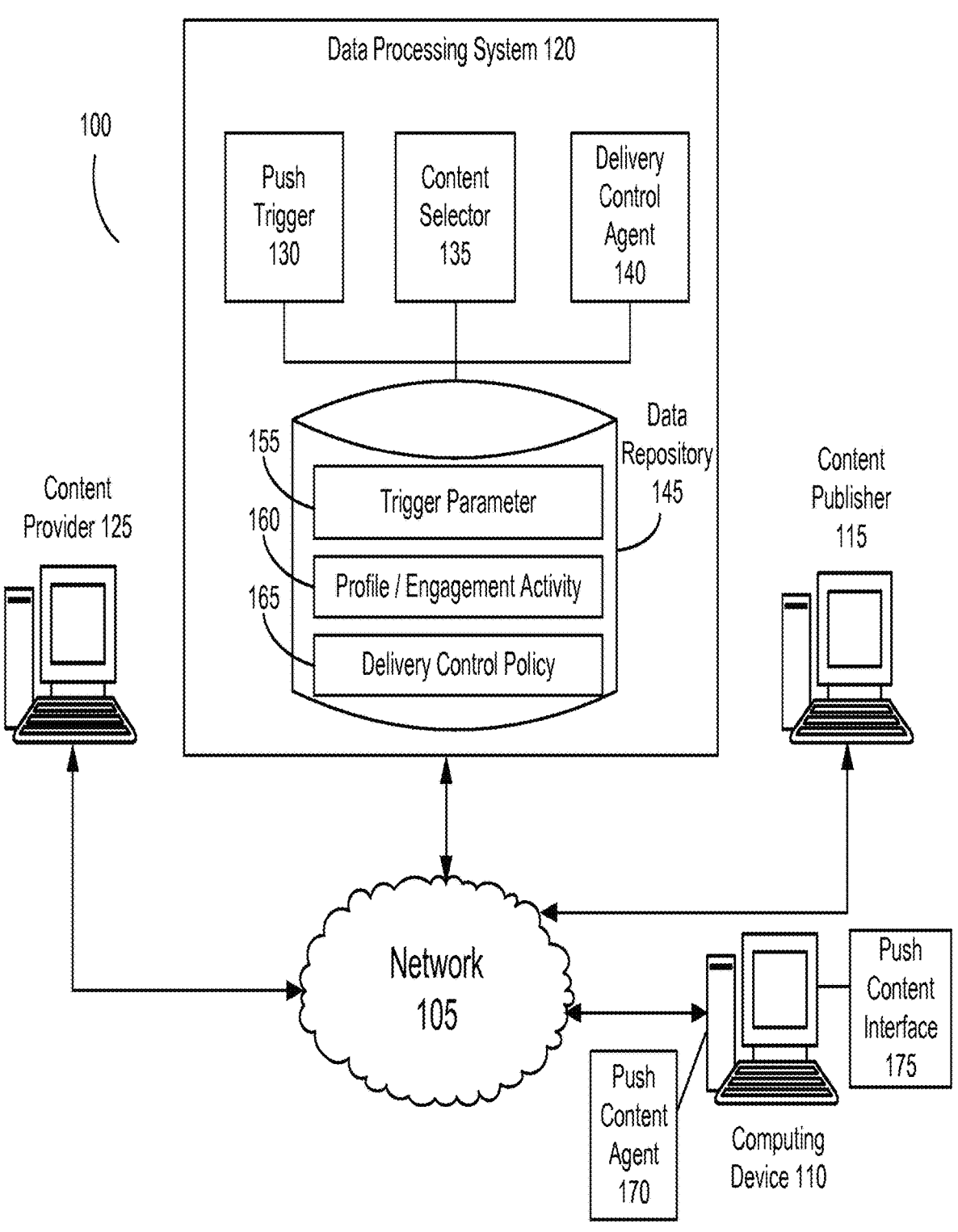
FIG. 1 depicts a system to provide content items via a push marketing auction in accordance with an implementation.

The present disclosure is generally directed to systems and methods for providing content items using a push marketing auction. Consumers are generally sensitive to receiving push content (such as SMS, text, notifications) on their computing devices. For example, sending push content items to a mobile computing device can drain a power source of battery of the mobile computing device battery, utilize the mobile computing device's limited processing resources (e.g., processor or memory), occupy limited screen space on an electronic display of the mobile computing device, utilize limited network bandwidth or limited network data allocation for the mobile computing device. Advertisers that are able to send push content to consumer devices have to be careful about the quantity and relevancy of push content items the advertisers can send as well as the content that they are sending as consumers may opt-out from receiving such push content items if the consumers are put off by either the quantity or relevancy of the push content items. As such, even though an advertiser may choose to send as many push content items as they like, advertisers limit the number of push content items they send to a consumer to avoid having the consumer opt-out from receiving any notifications from the advertiser. As a result, there is a limited supply of push content opportunities that advertisers can avail.

In contrast with online advertising in response to receiving a request for content from a consumer device, the present disclosure relates to sending push content independent of receiving a request for content. The present disclosure can determine, for an account identifier of a consumer, a type of push content item to create and a time at which to transmit the push content item. The present disclosure describes a data processing system that may select a type of push content item and a time at which to transmit the push content item based on historical consumer interactions with push content items. For instance, the data processing system can determine to send a text message at 9:04 am every morning in response to determining that the consumer has a 90% click through rate on links included in the text messages sent between 9:00 am and 9:10 am.

More generally, the present solution can (1) identify a push content opportunity or slot based on historical information associated with an account identifier (e.g., an optimal number of messages per account identifier or an optimal time when a user views messages); (2) determine a likelihood of engagement or interaction with a push content item presented in the push content slot (e.g., based on time, location, account profile information, type of communication channel or mode of communication, activity, device type, etc.); and (3) initiate an online push marketing auction that allows advertisers to bid on a likelihood of the user engaging with the push content item presented in the push content slot. The push content opportunity or slot can be in one or more communication channels or modes, such as text, SMS, email, notification, prompt, in-application notification, alert, etc.

In an illustrative implementation, the technology initiates an auction for an individual account identifier. The technology can initiate the auction responsive to a predetermined time interval (e.g., hourly, every minute, daily, 12 hours, etc.), location (e.g., triggering of a geofence), or a request from a content provider to provide content. The technology can initiate the auction with several candidate content items or electronic advertisements that are candidates for presentation in a push marketing content slot via a computing device of the account identifier. For example, content providers can set up content campaigns that include content items and corresponding content selection criteria and bids (e.g., base bids and bid modifiers based parameters associated with the auction such as location, device time, etc.). In this example, the content selection criteria (or a criterion thereof) can indicate to select content items for presentation to a predetermined interest list. Further to this example, the predetermined interest list can include the account identifier for which the technology initiates the push marketing auction. In some cases, a user of a computing device corresponding to the account identifier can electronically subscribe or otherwise opt-in or provide an indication to be included in the predetermined interest list.

The technology can select a content item from the plurality of candidate content items in the auction based on several parameters. A first parameter can include a likelihood of engagement. The likelihood of engagement can be unique to the account identifier and determined based on historical engagement or interaction based on time of day, day of the week, location, device type, mode of transportation (e.g., walking, driving, biking, train, bus, airplane), push channel (e.g., SMS, text message, electronic mail, alert, notification), network type (e.g., cell network, LTE, 3G, 4G, WIFI, hotspot, etc.). The auction can further determine a quality score or relevancy score based on contextual information associated with the candidate content items, historic browsing activity associated with the account identifier, or metadata associated with the predetermined interest list.

The technology can use one or more of the bid, likelihood of engagement, quality score or relevancy score to select a content item from the plurality of candidate content items via the auction. For example, the selected content item can have a highest auction score based on a combination of the bid (including base bid and bid modifier) and a relevancy score.

Upon selecting the content item, the technology can further apply a content delivery control policy specific to the account identifier. This content delivery control policy can be specific to the account identifier and take into account factors or parameters associated with the account identifier. For example, the technology can determine that a likelihood of engagement at the time of the auction for this account identifier does not satisfy a threshold. Responsive to determining that the likelihood of engagement for the account identifier does not satisfy the threshold, the content delivery control agent can terminate the auction or prevent any content item from being presented at the computing device of the account identifier. Thus, the present solution can conserve a device battery, computing resources, screen space, network data usage, or bandwidth by not sending indiscriminate push notifications or push content items.

In another example, the content delivery control agent can determine a number of push marketing content items previously presented via one or more computing devices of the account identifier within a time interval. If the selected content item of the current auction exceeds a threshold number of content items to present to the account identifier, the technology can terminate the auction and prevent the selected content item from being presented or transmitted via the computing device of the account identifier. Thus, the present solution can conserve a device battery, computing resources, screen space, network data usage, or bandwidth by not sending indiscriminate (e.g., irrelevant) push content items or too many push content items (e.g., beyond a maximum number threshold).

Thus, the present solution can select a content item via an online push content auction based on a likelihood of user engagement, and further control the delivery of the selected content item based on a delivery control policy, thereby reducing or eliminating spam messages sent to the computing device of the user, increasing a re-engagement rate, lowering a churn rate, and conserving or reducing the utilization of battery power, network bandwidth, and computing resources of the computing device of the user.

FIG. 1 illustrates an example system 100 for providing content items. The system 100 can include a content selection infrastructure or push marketing content selection infrastructure. The system 100 can include one or more components or functionality of system 300 or 301. The system 100 can include a data processing system 120 communicating with one or more of a content provider 125, content publisher 115 or computing devices 110a-n (also referred to as computing device 110) via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one content provider computing device 125. The data processing system 120 can be referred to as one or more servers of a push marketing content selection system. The computing device 110 can include at least one agent 170 such as push content agent 170. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include at least one push trigger 130, at least content selector 135, at least delivery control agent 140, and at least one data repository 145. The push trigger 130, content selector 135, and delivery control agent 140 can each include at least one processing unit or other logic device such as programmable logic array engine, or module configured to communicate with the database repository or database 145. The push trigger 130, content selector 130, delivery control agent 140 and data repository 145 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for push content. Push content items can include or refer to content items that are pushed or provided for display or presentation with via a computing device without receiving a request from the computing device for the content item. Examples of push content items can include electronic mail ("e-mail"), text messages, simple messaging service ("SMS") messages, notifications, alerts, prompts, chat messages, etc. For example, the data processing system 120 automatically generate a request to provide an advertisement via an e-mail to an e-mail address corresponding to an account identifier. The data processing system 120 can select a push content item from a content provider, and transmit the selected push content item via e-mail.

In some implementations, the data processing system 120 can generate the request for the push content. For example, the data processing system 120 can include a push trigger 130 designed, constructed, configured or executed to generate a request for content. The request can be for content to be presented in a push content slot corresponding to a specific account identifier. The account identifier can correspond to a username, unique identifier, computing device, login identifier, computing device identifier, predetermined identifier, an identifier associated with network activity, an identifier associated with a web browsing session, an identifier associated with a resource or application, an identifier associated with a phone number, an identifier associated with an electronic mail address, or an identifier associated with a messaging service or chat application.

The push trigger 130 can generate the request for an individual account identifier. The push trigger 130 can generate the request for an individual account identifier and one or more types or modes of presentation or communication associated with the account identifier. Modes of presentation can include, e.g., electronic mail, text message, notification, prompt, etc. For example, the data processing system 120 can generate a request for a specific account identifier and a specific mode, such as text messaging.

In some cases, the request may include a query such as a search query input into a search engine of the data processing system or other system. The input query may include text, characters, symbols, etc. The data processing system 120 may receive the input query from a computing device 110 via network 105 or may retrieve search query from a database storing historical search query information associated with an account identifier associated with the computing device 110. The input query may include audio (e.g., words spoken by a user of the computing device 110 and input into the search engine of the data processing system via network 105 and an interface). The request may include or be associated with information that facilitates selecting content responsive to the request. The information may include, e.g., contextual information about an electronic document, web page, electronic application, or organic, non-advertisement link on which the selected content is to be displayed. The request can include preferences associated with the account identifier, sensor information, location information, temporal information, etc. The data processing system 120 may provide an interface displaying input text boxes, buttons, drop downs, or other widgets through which a user of a client can select or otherwise indicate a category for the search.

The push trigger 130 can automatically generate the request based on an event, condition, or other parameter. In some cases, the push trigger can generate the request based on a condition or event. To automatically generate the request based on a condition or event, the push trigger 130 can retrieve a trigger parameter from a trigger parameter database 155 or trigger parameter data structure 155, or trigger parameter record 155 stored in data repository 145 or database 145. The push trigger 130 can perform a lookup in the trigger parameter data structure 155 using the account identifier to identify a value for the trigger parameter. Trigger parameters 155 can include, e.g., a time interval, time period, location, geofence, activity, sensor information (e.g., accelerometer, global positioning system sensor information), mode of transportation, etc. Automatically generating a request can refer to generating the request for content independent of user input into a user interface of the computing device.

The push trigger 130 can generate a request based on a trigger parameter including a time interval parameter. For example, an administrator of the data processing system can instruct or configure the push trigger 130 to generate a request for push content for one or more account identifiers based on a time interval. The push trigger 130 can retrieve, for the one or more account identifiers, a value or time interval value corresponding to the time interval parameter. The value can be a minute, 5 minutes, 30 minutes, an hour, 12 hours, or some other time period (e.g., the time interval parameter can have a value for an account identifier from 1 minute to 12 hours). The push trigger 130 can include a counter that can be configured to use the value of the time interval parameter.

Push trigger 130 can generate a request for push content for an account identifier independent of activity of a computing device associated or linked with the account identifier. For example, the push trigger 130 can generate the request independent of a user of the computing device accessing a webpage or inputting a search query into a search engine. Thus, the push trigger 130 can automatically generate the request for push content based on factors, events, or conditions independent of activity of the computing device.

Responsive to the request for push content (e.g., electronic advertisements), the data processing system 120 (e.g., via content selector 135) can identify, select or otherwise obtain content to be provided or presented via the computing device 110 making the request, or some other computing device 110 associated with the request for content. In some implementations, the data processing system 120 may identify, select, or otherwise obtain content without receiving a request for content. In some implementations, the content selector 135 receives the request for content generated by the push trigger 130. The request can be in the form of a call, function call, application programming interface ("API") call, script, etc.

The push content being requested can include, e.g., text, characters, symbols, images, video, audio, or multimedia content. The push content item may include an advertisement in the form of a sponsored link (e.g., provided by content providers). The push content item can include an online advertisement, article, promotion, coupon, or product description.

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

Content providers 125 can provide content to be presented via a computing device responsive to a request (e.g., request generated by push trigger 130 executing on data processing system 120 or server thereof). Content providers 125, such as advertisers, can establish one or more push content campaigns or push content groups with push content items and content selection criteria (e.g., keywords, topics, location information, bidding parameters, base bid, bid modifier, etc.). In some implementations, content providers 125, can establish one or more content campaigns or content groups that include both push content items and non-push content items (e.g., advertisements provided for display with a webpage responsive to a request for an advertisements for display with the webpage). Push content items can include or refer to content items that are pushed or provided for display or presentation with via a computing device without receiving a request from the computing device for the content item. Examples of push content items can include electronic mail ("e-mail"), text messages, simple messaging service ("SMS") messages, notifications, alerts, prompts, chat messages, etc. For example, the data processing system 120 automatically generate a request to provide an advertisement via an e-mail to an e-mail address corresponding to an account identifier. The data processing system 120 can select a push content item from a content provider, and transmit the selected push content item via e-mail.

The data processing system 120 may identify multiple content items (e.g., a first candidate content item and a second candidate content item) that are responsive to the request for content, or are otherwise candidates for display on an online document (e.g., a web page or a page of an online marketplace). The data processing system may initiate or utilize an online push auction process to select one or more of the multiple candidate push content items to present in a push content slot. A push auction system may determine two or more bids (e.g., monetary bids, point bids, token bids) for content items to be displayed in push content slot. The auction system can run the bids through the push auction process to determine one or more highest ranking auction scores. Push content items corresponding to the winning bids or highest ranking bids may be selected for presentation in a push content item slot via a computing device.

The data processing system 120 can analyze, parse, or otherwise process subject matter of associated with a profile or an account identifier or the candidate push content items to determine whether the subject matter of the candidate content items correspond to the profile or other selection criteria. The data processing system 120 can identify, analyze, or recognize terms, characters, text, symbols, or images of the request, profile of the account identifier, browsing history, or candidate content items using an image processing technique, character recognition technique, or database lookup. The candidate push content items may include metadata indicative of the subject matter of the candidate push content items, in which case the content selector 135 may process the metadata to determine whether the subject matter of the candidate content item corresponds to the web page.

Content providers may provide additional indicators when setting up a push content campaign that includes push content items. The content provider 125 may provide information at the push content campaign or push content group level that the data processing system 120 may identify by performing a lookup using information about the candidate content item. For example, the candidate content item may include a unique identifier, which may map to a content group, content campaign, or content provider. The data processing system 120 may determine, based on information stored in data repository 145 about the content provider (e.g., advertiser), that the candidate content item is relevant or matches a request for a push content item or subject matter associated with the account identifier associated with the request. The data processing system 120 may select the content item based on network activity information, browsing history information, profile information etc. associated with the computing device 110 or account identifier for which the push trigger 130 generated the request for the push content item.

In some implementations, a content provider 125 can setup a push content campaign or push content group that includes content selection criteria indicative of a subscription list. For example, an account identifier may provide an indication of interest in a topic or subject. A data processing system 120 can receive the indication of interest and identify a corresponding identifier. The data processing system 120 can receive the indication of interest via a voluntary user interface input, such as via an electronic survey, button, prompt, drop down menu, input text box, or other user interface element or widget. The data processing system 120 can store the indication of interest in the topic in a data structure or data record along with other received indications of interest from other account identifier. The data processing system 120 can generate a list for the topic with the anonymous account identifiers that indicates an interest. Further, the content provider 125 can configure the push content campaign to instruct the push trigger 130 to generate the request for a push content item for the account identifier. Thus, a content provider 125 can configure a push content campaign to provide push content items to account identifiers associated with the list for the topic.

The data processing system 120 (e.g., content selector 135) can establish a push auction with multiple candidate push content items. The push auction can be a real-time push auction established by the content selector 135 responsive to receiving a request for a push content item from the push trigger 130. The content selector 135 can score or rank the candidate push content items via the auction to identify a highest ranking push content item to provide for presentation via the computing device 110. The content selector can determine, for each candidate content push item, one or more scores. The content selector can determine, for each candidate push content item, an intermediate score or preliminary score, and combine the intermediate or preliminary scores to generate an auction score. The one or more scores can include a relevancy score, quality score, bid score or bid amount (e.g., a base bid or a base bid adjusted by a bid modifier), and a likelihood of engagement score. The content selector 135 can combine the one or more scores for each candidate push content item and combine the one or more scores to generate an auction score for each candidate push content item.

The content selector 135 can generate a relevancy score for a candidate push content item. The content selector 135 can generate the relevancy score by comparing or matching information of the candidate content item with information corresponding to the account identifier. The content selector 135 can generate the relevancy score by comparing content selection criteria of the candidate push content item with profile information associated with the account identifier. For example, the content selector 135 can access a database 145 storing profile information for an account identifier. The content selector 135 can obtain the account identifier via the request from the push trigger 130. The push trigger 130 can generate the request to include or indicate the account identifier, and provide or convey the request to the content selector 135.

The content selector 135 can access profile information for the account identifier in database 145. Database 145 can include a profile data structure 160. The content selector 135 can perform a lookup in the profile data structure 160 using the account identifier to retrieve profile information for the account identifier. The profile information can include, e.g., preference information, interests, historical network activity information, historical browsing session information, location information, list subscriptions, etc. The content selector 135 can determine, using the profile information, a topic of interest associated with the account identifier. For example, a computing device associated with the account identifier may have visited websites about cars in the last 24 hours. The websites about cars may include car dealerships and websites with car reviews. Thus, the data processing system 120 can determine can correlate the account identifier with an interest in cars. The data processing system 120 can further determine that a candidate push content item is about cars. By comparing the topic of interest of the account identifier and the topic of the candidate content item, the data processing system 120 can determine a relevancy score. The relevancy score can include a numeric score (e.g. 0 to 1; 1 to 100; 0 to 100; 0 to 10; 1 to 10, etc.), letter grade (e.g., A, B, C, D, F), color, symbol, or other indicator that indicates a level of relevancy or matching between the candidate push content item and the account identifier. For example, if the topic and keywords of the candidate push content item match a topic of interest and keywords associated with the account identifier, the relevancy score may be high (e.g., 0.9).

The data processing system 120 can determine a likelihood of engagement score for each candidate push content item. The likelihood of engagement can refer to a predicted or estimated probability that a user corresponding to the account identifier interacts with the push content item in an intended manner. An engagement can refer to selecting a link in the push content item, clicking on the push content item, completing a survey in the push content item, purchasing a product advertised in the push content item, signing up for a subscription or newsletter responsive to the push content item, reading the push content item, reading and not deleting the push content item, etc.

The data processing system 120 can determine the likelihood of engagement score using historical engagement activity information for the account identifier. The data processing system 120 can access a profile or engagement activity data structure 160 stored in data repository 145. The engagement activity data structure 160 can include, for an account identifier, information about historic or previous engagement or interactions with content items or push content items. For example, for each content item impression or push content item impression, the engagement activity data structure 160 can record, in a field, an identifier of the push content item, whether the push content item was selected, whether the push content item resulted in a conversion, time or date stamp of the impression, time or date stamp of the conversion, location of the computing device, mode of transportation of the computing device, etc. The engagement activity data structure 160 can aggregate the engagement activity information across multiple content item impressions (or only push content item impressions) for a specific account identifier.

In some implementations, the content selector 135 can generate an engagement activity predictive model for the account identifier using the information stored in the engagement activity data structure 160. The content selector 135 can include or utilize a machine learning engine or machine learning model to generate the predictive model for the engagement activity. Machine learning models can include, e.g., a statistic machine learning model, logistic regression model, regression, neural network, Bayesian classifier, decision tree, etc. The content selector 135 can use the machine learning model (or weights generated using the model) to predict, for a candidate push content item, a likelihood of engagement. The content selector 135 can generate weights using the engagement activity model by inputting one or more features into the engagement activity model to generate a weight indicative of a likelihood of engagement corresponding to the one or more features or feature combination. For example, a first feature can include a time of day corresponding to the request generated by the push trigger 130, and a second feature can include a mode of communication, such as an SMS text message. The content selector can input these two feature values (e.g., time of day and SMS text message mode) into the engagement activity model generated using a machine learning engine to determine that a likelihood of engagement corresponding to this feature combination is high. In another example, the content selector 135 may determine, for the same account identifier, that the likelihood of engagement is low based on a different time of day.

In an illustrative example, the data processing system 120 can determine that a user of a computing device corresponding to the account identifier may likely engage with push content items between 8:30 AM and 9 AM on weekdays. This high likelihood of engagement may be due to the user commuting to work via public transportation at this time. The data processing system 120 can determine the high likelihood of engagement based on identifying selections or conversions on push content items historically presented to the computing device during this time period. In another example, a feature can include a topic of interest, geographic location, device type (e.g., laptop, mobile device, notebooks, wearable, smartwatch, etc.).

The data processing system 120 (e.g., via content selector 135) can determine a bid amount for each candidate push content item. The bid amount can be determined based on a bid amount provided by a content provider 125 for the candidate push content item set via a push content campaign. The base bid amount can include a monetary amount or a point amount. For example, the base bid amount for a candidate push content item can be $1.00. The content provider 125 can further provide a bid modifier or bid multiplier. The content selector 135 can retrieve the bid modifier along with the base bid amount and apply the bid modifier to the base bid amount to adjust a bid for the candidate push content item. The content selector 135 can apply or adjust the bid using the bid modifier during the push auction or prior to entering the candidate push content item into the push auction. The content provider 125 can configure the bid modifier to adjust a base bid responsive to a condition or criteria or parameter. For example, the bid modifier can be configured to double a base bid if the account identifier corresponds to a profile that indicates an interest in cars. In another example, the bid modifier can be configured to increase a base bid by 50% if the account identifier corresponds to a profile that indicates a high likelihood of engagement between 9:30 and 10 AM on a weekday.

To determine the auction score, the content selector 135 can combine one or more of a relevancy score, likelihood of engagement score and bid amount. The content selector 135 can be configured with one or more techniques to determine the auction score for the candidate push content item for the account identifier using one or more of the likelihood of engagement score, relevancy score or bid amount. For example, the content selector 135 can determine the auction score based on a product of the relevancy score, likelihood engagement score and bid amount. In another example, the content selector can determine the auction score for the candidate push content item based on a sum of the relevancy score, likelihood of engagement score and bid amount. In yet another example, the content selector can determine the auction score based on a sum of the relevancy score and the likelihood of engagement score, and multiply the sum with the bid amount, where the bid amount is adjusted based on the bid modifier.

The data processing system 120 can determine a likelihood of engagement for a push content item based on information about a push content slot. The data processing system 120 can use information about the push content item and information about the push content slot. Information about the push content item can include a topic, vertical, category, location of content provider or retail location, keyword, etc. Information about a push content slot can include a time window for delivering/presenting the push content item in the push content slot, a mode of delivery (e.g., SMS, e-mail, notification, alert, etc.), media type (e.g., text, images, video, audio), geographical location of the computing device (e.g., state, town, city, latitude, longitude, map cell), mode of transportation (e.g., walking, driving, bus, train, airplane), etc. In an illustrative example, information about a push content item can indicate that the push content item is an advertisement for a coffee shop. Information about the push content slot (or potential push content slot or potential push content opportunity) is a presentation time of 9 AM. The data processing system 120 can determine, based on a historical model, that a likelihood of engagement or relevancy score for the push content item for coffee in a push content slot at 9 AM is high. The data processing system 120 may further determine that a likelihood of engagement is high if the push content item is for a coffee shop that is located at a geographic location that is nearby to the computing device. The data processing system 120 may further determine that the likelihood of engagement is high if the mode of transportation of the computing device is walking by the coffee shop.

In another example, the data processing system 120 may determine the likelihood of engagement is low for a push content item for a coffee shop if it is to be presented in a push content slot at 9 PM at night.

Upon determining an auction score for each candidate push content item in the push auction, the content selector 135 can select one or more candidate push content items by ranking the candidate push content items based on the respective auction score. For example, the content selector 135 can select a highest ranking candidate push content item as a potential push content item for presentation via a computing device of the account identifier. The data processing system 120 can provide the selected push content item for presentation via the computing device.

In some implementations, the data processing system 120 can determine whether to deliver the push content item selected via the push auction. The data processing system 120 can include a delivery control agent 140 designed, constructed, configured or executed to control the delivery of the push content item selected by the content selector via the push auction. For example, the data processing system 120 can perform a first content selection process to identify candidate content items, perform a second content selectin process to selected a push content item from the candidate content items, and then perform a third content selection process to control delivery of the selected push content item. Thus, the delivery control agent can conserve the battery or power source of a computing device, computing resources of the computing device, screen space, network data usage, or network bandwidth by control which push content items are approved or authorized for delivery, there by not sending or reducing the amount of indiscriminate push content items that are sent.

In an illustrative example, the data processing system 120 can select a push content item via the push auction because the push content item is the highest ranking push content among the candidate push content items. However, the data processing system 120 may determine that a characteristic, score, feature, or parameter of or associated with the push content item or the push content slot does not satisfy a threshold or other precondition for delivery, and determine to block or prevent delivery of the selected push content item. For example, the parameter may be a predicted likelihood of engagement for the push content item in the push content slot. The value of the parameter can be compared with a threshold likelihood of engagement. If the value of the parameter is less than the threshold for the parameter, then the data processing system 120 can block the push content item from delivery. In an illustrative example, the push content item may be an advertisement or coupon for a coffee shop. The data processing system 120 can determine, using the profile/engagement activity data structure 160 or engagement activity model generating using a machine learning technique, that the likelihood of engagement is 0.1. The threshold likelihood of engagement for deliver may be 0.2; thus, the data processing system 120 may block or prevent delivery of the push content item. The predicted low likelihood of engagement may be because the push content item topic is coffee, and the push content item slot is for a time window of 6 PM at night. In another example, the likelihood of engagement may be low for a push content item corresponding to an advertisement for a new smartphone because the push content slot is to presented via a computing device type that corresponds to newly released device.

Since the content item is a push content item to be provided via a push communication mode, the data processing system 120 can determine to not respond to the request automatically generated by the push trigger 130 by providing a content item. The data processing system 120 can determine to allow the request generated by the push trigger 130 to go unfulfilled.

To control delivery of the selected push content item, the delivery control agent 140 can retrieve, obtain, or identify a delivery control policy used to control delivery of the selected push content item. The data processing system 120 can access a data repository 145 storing policies in a delivery control policy data structure 165. The deliver control policies can be specific to an account identifier by taking into account parameters or values for parameters that are determined based on the account identifier. The parameters can include, e.g., location, mode of transportation, temporal parameters, type of computing device, mode of delivery for the push content item, maximum number of push content items during a time interval, or minimum likelihood of engagement. One or more parameters can be dependent on other parameters. For example, the likelihood of engagement can be specific to or take into account a time of day, type of computing device, mode of delivery for the push content item (e.g., text message versus e-mail), geographic location, mode of transportation, etc.

In an illustrative example, a delivery control policy for a specific account identifier can be based on a maximum number of push content items to deliver during a time interval. The delivery control agent 140 can perform a lookup or otherwise access the delivery control policy data structure 165 to determine a threshold value for the maximum number during a time interval. In this example, the parameter is number of push content items during time interval; the value of the parameter is the number of push content items delivered to the computing device or account identifier during the time interval; and the threshold for the parameter is the maximum number. Further to this example, the delivery control agent 140 can determine the threshold value to be a maximum of 3 push content items during a 3 hour time interval. The delivery control agent 140, upon determining the threshold value for the parameter, can apply the corresponding delivery control policy to the push content item to authorize the push content item for delivery. To apply the policy, the delivery control agent 140 can access the database 145 to determine a value for the number of push content items delivered to the account identifier (or to the account identifier via specific delivery mode if the policy indicates a mode-specific maximum number). For example, the engagement activity data structure 160 for the account identifier can indicate a number of push content items delivered to the account identifier in the last three hours as a value of 2. The delivery control agent 140, can compare the value of 2 push content items delivered to the account identifier in the last three hours with the threshold value of 3 push content items to determine that the policy has been satisfied. For example, the delivery control agent 140 can determine whether delivering the selected push content item will result in exceeding the maximum number of push content items using the following function: if value of parameter is less than the threshold, then deliver content item; or if value of parameter is greater than or equal to the threshold, then block delivery of push content item. The data processing system 120, responsive to determining that the value satisfies the threshold set by the policy, can authorize the push content item for delivery to the computing device 110 of the account identifier. However, if the data processing system 120 determines that the value does not satisfy the threshold set by the policy, the data processing system 120 can deny, reject, or block the delivery of the push content item, thereby conserving network bandwidth or computing resources by reducing the number of push content items that are sent.

In some implementations, the threshold maximum number of push content items to be delivered during a time interval can change based on a location of a computing device of the account identifier, a time, location (e.g., home, away from home, vacation, work), mode of transportation, etc. In some cases, the delivery control policy database 165 can include a threshold data structure that indicates a maximum number for various scenarios as illustrated in Table 1 as follows:

TABLE 1

Example thresholds for maximum number of push content items

| Priority | Feature | Threshold Maximum Number of Push Content Items |
|---|---|---|
| 1 | Location = near (e.g., 1 mile, 2 miles, walking distance, 10 minutes driving) content provider of selected push | 25 |

18

TABLE 1-continued

Example thresholds for maximum number of push content items

| Priority | Feature | Threshold Maximum Number of Push Content Items |
|---|---|---|
|  | content item & mode of delivery = e-mail |  |
| 2 | Time range 8 AM to 10 AM & Mode of transportation = train or bus | 5 |
| 3 | Time range 8 AM to 10 AM & mode of delivery = e-mail or SMS text message | 3 |
| 4 | Time Range 10 AM to 12 PM & Day = Saturday or Sunday or Holiday | 3 |
| 5 | Time Range 10 AM to 12 PM | 0 |
| 6 | Time Range 12 PM to 2:30 PM & Location = home | 4 |
| 7 | Time Range 12 PM to 2:30 PM & Location = work | 2 |
| 8 | Time Range 12 PM to 2:30 PM | 1 |
| 9 | Location = home | 3 |

In some implementations, the delivery control agent 140 identifies, creates, or generates the push content slot or push content opportunity based on the delivery control policy. If the policy is not satisfied, the delivery control agent 140 can prevent or block the push content item from being delivered, or indicate that there is no push content opportunity for the content item selected via the push auction. In some cases, the delivery control policy can be unique to an account identifier and generated based on a likelihood of engagement. The data processing system 120 can obtain historic engagement activity information for the account identifier and generate an engagement activity model that can predict a likelihood of engagement based on one or more features. The delivery control agent 140 can control delivery based on a value of the predicted likelihood of engagement parameter for the feature or feature combination satisfying a threshold. Thus, even if the selected push content item corresponds to the highest auction score in the push auction and the highest likelihood of engagement, the delivery control agent 140 can determine to block delivery of the push content item. The likelihood of engagement threshold can vary based on time, location, mode of transportation, bid amount, etc. as illustrated in Table 2.

TABLE 2

Example thresholds for likelihood of engagement parameter

| Priority | Feature | Threshold Likelihood of Engagement |
|---|---|---|
| 1 | 8 AM to 10 AM & mode of transportation = train or bus or walking & weekday | 0.2 |
| 2 | 8 AM to 10 AM & mode of transportation = driving | 0.99 |
| 3 | 10 AM to 12 AM & location = vacation | 0.1 |
| 4 | 10 AM to 12 AM & location = work | 0.7 |

As illustrated in Table 2, a higher likelihood of engagement threshold configures the delivery control agent 140 to authorize delivery of the push content item if there is a high likelihood of engagement with the push content item. For example, if the mode of transportation is driving, then the delivery control policy 140 can be configured with a 0.99 threshold such that the push content item will most likely be blocked from delivery. However, if the mode of transportation is train or bus and it is between 8 AM and 10 AM, the likelihood of engagement threshold can be set lower to increase the likelihood that the push content item will be delivered.

In an illustrative example, the push content item can include an advertisement for a coffee shop. The data processing system 120 identify a low threshold for a likelihood of engagement if the push content item is for coffee during the hours of 8 AM to 10 AM because many users may be interested in coffee during those hours. Thus, even if a predicted likelihood of engagement is low for a particular account identifier, the data processing system 120 may determine to deliver the push content item as long as it satisfies the lowered threshold. Thus, the data processing system 120 is more likely to deliver the push content item for coffee even if the predicted likelihood of engagement for an account identifier is low (e.g., 0.2 as illustrated in Table 2).

In some implementations, the threshold maximum number of push content items can vary based on a likelihood of engagement as illustrated in Table 3:

| Priority | Feature | Threshold Maximum Number of Push Content Items |
|---|---|---|
| 1 | 8 AM to 10 AM & mode of transportation = train or bus & likelihood of engagement is >0.5 | 7 |
| 2 | 8 AM to 10 AM & mode of transportation = train or bus & likelihood of engagement is <0.2 | 3 |
| 3 | 8 AM to 12 PM & location = home & day = weekend or holiday & likelihood of engagement is >0.4 | 7 |

Using one or more delivery control policies, the delivery control agent 140 can control delivery (e.g., authorize or block) of a push content item that is selected via the push auction as being the highest ranked push content item. Thus, the push content item slot can refer to the delivery control agent 140 identifying a push content item that is authorized to be delivered to a computing device of the account identifier via a mode of push delivery, such as e-mail, text messaging, notification, prompt, alert, or other application or resource executed by the computing device configured to receive push messages.

The data processing system 120 can provide the push content item via the network 105. The data processing system 120 can transmit the selected and authorized push content item for presentation in the push content slot via the computing device linked to the account identifier. The data processing system 120 can convert or translate the push content item based on the mode of delivery. For example, the push content item can be stored in the data repository 145 in a first format. The data processing system 120 can determine that the mode of delivery is SMS text message. Response to the determining the authorized mode of delivery for the push content item slot, the data processing system 120 can format the push content item for the mode of delivery. For example, if the push content item is stored in an HTML format, the data processing system 120 can translate the push content item from the HTML format to an SMS format.

In some implementations, the data processing system 120 can receive information to from a push content agent 170 configured or executed by the computing device. The information can facilitate content selection or controlling delivery of a selected push content item. The information can include, e.g., location information, activity information, mode of transportation, type of device, profile information, preferences, etc. The push content agent 170 can communicate or interface with one or more components or sensors of the computing device.

For example, the computing device 110 can include a feature data structure that stores a location of the computing device, time of day, a profile associated with the computing device, profile information associated with or voluntarily provided by a user of the computing device and stored in the data repository, a type of computing, operating system of the computing device, historical browsing activity associated with the computing device, mode of transportation of the computing device (e.g., walking or driving), environmental information, etc. In some implementations, the data processing system 120 can receive information stored in the feature data structure via the agent 170. The type of computing device may include, for example, mobile device, mobile telecommunications device, desktop computer, laptop computer, tablet, smartphone, electronic book reader, smartwatch, wearable computing device, gaming device, television set top box, digital media player, microconsole. The type of computing device may further indicate, for example, an operating system, available resources, or device information.

The push content agent 170 may determine, identify, obtain or retrieve the geographic location using sensor information received from the computing device 110. For example, location information can be provided or determined via one or more of a global positioning sensor configured on the computing device, WIFI or cell phone tower triangulation, internet protocol address, beacon technology, prompt via a user interface for location information, etc. Mode of transportation can be determined via sensors of the computing device, such as an accelerometer or gyroscope, as well based on subsequent pings with the location information. The data processing system 120 can determine profile information or historical browsing activity based on associating a unique identifier with the computing device, and accessing a database (e.g., data repository 145) with profile information associated with the unique identifier. For example, historical web browsing activity can be associated with the unique identifier of the computing device, such as a username, anonymous randomly generated identifier, IP address, etc. In some cases, the data processing system 120 can include a geographic location module designed and constructed to receive geo-location data points associated with a computing device 110. The data processing system 120 can receive the data points via a computer network 105 via a TCP/IP protocol, cell phone data network, or another communication protocol of computer network 105. The data points can include location information and time information, or the data processing system 120 can determine the location or time information associated with a received data point upon receiving the data point from the computing device 110. The data processing system 120 can also receive an identifier associated with the data point, such as a unique user device identifier, or a username associated with an application executing on the user device 110. In one implementation, an application executing on the user device 110 (e.g., a mobile application, a mobile operating system, a web browser, or a map application) can transmit the geo-location data point that includes the location information. In one implementation, a mobile user device 110 may periodically ping the data processing system 120 or other intermediate system to provide location or time information. In one implementation, a smartphone or other cellular enabled user device 110 can ping a cell phone tower system, which may then provide location or time information to the data processing system 120.

FIG. 2 illustrates a method 200 for providing content items accordance with an implementation. The method 200 can be performed by system 100, system 300, 301, data processing system 120, computing system 400, or one or more component thereof. In some implementations, at 205, a data processing system generates a request to transmit content in a push content slot of an account identifier. The account identifier can be linked with a computing device. At 210, the data processing system can establish a push auction for the account identifier with multiple candidate push content items. At 215, the data processing system can determine an auction score for each candidate push content item. At 220, the data processing system can select a push content item from the multiple candidate push content items based on the auction score. At 225, the data processing system can determine a parameter used to control delivery of push content items. The data processing system can control delivery of the selected push content item based on information associated with the account identifier. At 230, the data processing system can compare a value of the parameter with a threshold value to authorize the push content item. At 235, the data processing system can provide the selected push content item for presentation in a push content slot via the computing device linked to the account identifier.

Still referring to FIG. 2, and in further detail, at 205, a data processing system generates a request to transmit content in a push content slot of an account identifier. For example, a push trigger of the data processing system can generate the request. The data processing system can generate the request automatically without receiving any request or indication of a request for content from the computing device. The data processing system can generate the request for a push content item independent of activity or user input of the computing device. For example, the data processing system can generate requests for push content items for an account identifier based on a time interval, such as every minute, every 5 minutes, every 10 minutes, every hour, etc.

The data processing system can generate the request for a push content item responsive to a content provider providing an indication to provide push content items to account identifiers having a profile that indicates a topic of interest. For example, a user having an account identifier may voluntary indicate to the data processing system an interest in a topic such as cars, sports, vacation, shoes, etc. A content provider can setup a content campaign with content selection criteria that indicates to provide push content items to account identifiers having a profile that indicates an interest in cars. Thus, the data processing system can generate the request to transmit content for the account identifier responsive to an instruction from a content provider provided via a content campaign comprising at least one of the plurality of candidate content items.

At 210, the data processing system (e.g., via a content selector) can establish a push auction for the account identifier with multiple candidate push content items. The push auction can be a real-time push auction. A real-time push auction can refer to establishing the auction responsive to the request generated by the data processing system. The real-time push auction can refer to establishing the auction and delivering the push content item (or determining whether to deliver the push content item) responsive to identifying a highest ranked push content item via the real-time push auction.

At 215, the data processing system can determine an auction score for each candidate push content item. The data processing system (e.g., via the content selector) can determine the auction score based on a likelihood of engagement with the candidate push content item, bid amount, relevancy, quality score, predicted click through rate, predicted conversion rate, predicted return on investment, cost per click, or other metrics. In some implementations, the data processing system can determine the auction score based on the likelihood of engagement. The data processing system can determine the likelihood of engagement based on historic engagement activity for the account identifier. For example, over a time period of 30 days, the data processing system can monitor engagement activity with push content items. The data processing system can monitor a topic or keyword of the push content item, time of delivery, location of computing device, mode of delivery, click through rate, conversion rate, etc. The data processing system can generate a predictive model such as a statistical machine learning model based on the historical activity information. The data processing system can use the model to predict a likelihood of engagement when one or more features are present. For example, the data processing system can determine current features associated with a potential push content slot such as time of day and location. The data processing system can input the time of day and location feature combination into the model to generate a weight indicative of a likelihood of engagement (e.g., 0.5).

The data processing system can combine the likelihood of engagement with a bid amount to determine an auction score. For example, the data processing system may determine a product of the likelihood of engagement and the bid amount to determine the auction score. At 220, the data processing system can select a push content item from the multiple candidate push content items based on the auction score. The data processing system can rank the candidate content items based on the auction score to select a highest ranking content item. For example, the data processing system can generate a data record including an ordered list in memory. The data processing system can select the first entry in the data record as the highest ranking push content item.

In some implementations, the data processing system can determine a time stamp corresponding to establishing the push auction and identify a likelihood of engagement for the specific account identifier based on the time stamp. For example, a first account identifier may correspond to a likelihood of engagement of 0.5 between 9 AM and 10 AM, while a second account identifier different from the first account identifier may correspond to a likelihood of engagement of 0.3 between 9 AM and 10 AM. The data processing system can perform a lookup in a data structure using the account identifier and the time stamp of the push auction (or planned push content item delivery time) to identify the likelihood of engagement. In some implementations, the data processing system can use the predictive engagement activity model for a specific account identifier to identify, determine or generate the likelihood of engagement.

In some implementations, the data processing system can determine the auction score using a bid amount assigned or set by a content provider for a content campaign or content group corresponding to the candidate push content item. The bid amount can be based on a base bid and a bid modifier. A base bid may refer to an initial or baseline bid amount, such as $1.00. A bid modify or bid multiplier can refer to a bid adjustment factor. A content provider may choose to increase (or decrease) a bid amount based on a feature or characteristic associated with the presentation of the push content item. For example, the content provider may set the bid modifier to increase the bid amount if the account identifier has a profile that indicates an interest in cars. In another example, the content provider may set the bid modifier to increase the bid amount if the computing device linked to the account identifier is at a location within a predetermined distance (e.g., 1 mile, 5 miles, 5 minute walk, 10 minute drive, etc.) to a retail location of the content provider.

At 225, the data processing system (e.g., a delivery control agent) can determine a parameter used to control delivery of push content items. The data processing system can control delivery of the selected push content item based on information associated with the account identifier. The data processing system can authorize delivery of the push content item for presentation via the computing device responsive to or based on the delivery control policy.

In some implementations, the delivery control policy can be based on a maximum number of push content items to provide during a time interval. For example, the data processing system can retrieve, for the account identifier, a threshold for a maximum number of push content items parameter. The data processing system can determine a value for the account identifier for the number of push content items parameter. The data processing system can compare the value for the account identifier with the threshold value to determine whether delivering the push content item would exceed the threshold. If delivering the push content item would exceed the threshold value, then the data processing system can block or prevent the delivery of the push content item during the time interval. If delivering the push content item would not exceed the threshold value, the data processing system can authorize delivery.

In some implementations, the data processing system can determine the threshold parameter based on a historical model associated with the account identifier. The historical engagement activity model, for example, can indicate that a likelihood of engagement for up to three content items during a two hour time period remains about 0.5, but that the likelihood of engagement of a fourth content item presented in the two hour time period drops to 0.2. Thus, the data processing system can determine, using historical engagement activity data, to set the threshold for the number of push content items parameter for the account identifier to a maximum of three push content items during a two hour time period.

At 230, the data processing system can compare a value of the parameter with a threshold value to authorize the push content item. For example, the data processing system can compare a the number of push content items previously provided for presentation via one or more computing devices linked to the account identifier during a predetermined time interval. The data processing system can compare this number to the threshold number and authorize the selected push content item based on the number being less than the maximum number of push content items determined from the policy database.

At 235, the data processing system can provide the selected push content item for presentation in a push content slot via the computing device linked to the account identifier. The push content slot can refer to an push content item opportunity determined based on a delivery control policy. For example, if the delivery control policy is satisfied, the data processing system can determine there is a push content item opportunity or slot. However, if the delivery control policy is not satisfied (e.g., a low likelihood of engagement, exceeds maximum number of push content items, location out of predetermined range, time stamp outside of time window), then the data processing system can determine there is no push content slot or push content opportunity in which to present the push content item via the computing device linked to the account identifier.

The data processing system can provide the push content item via one or more push communication technologies, including, e.g., e-mail, text message, SMS message, notification, prompt. The data processing system can generate a push messaging data package and communicate or transmit the push message package to an application or resource configured on, and executed by, the computing device to receive the push messaging data package and present the package via the computing device. Presenting the push content item can include displaying the push content item via a display interface, presenting the push content item via audio or video, haptic feedback, motion feedback, etc.

Figure 3A:
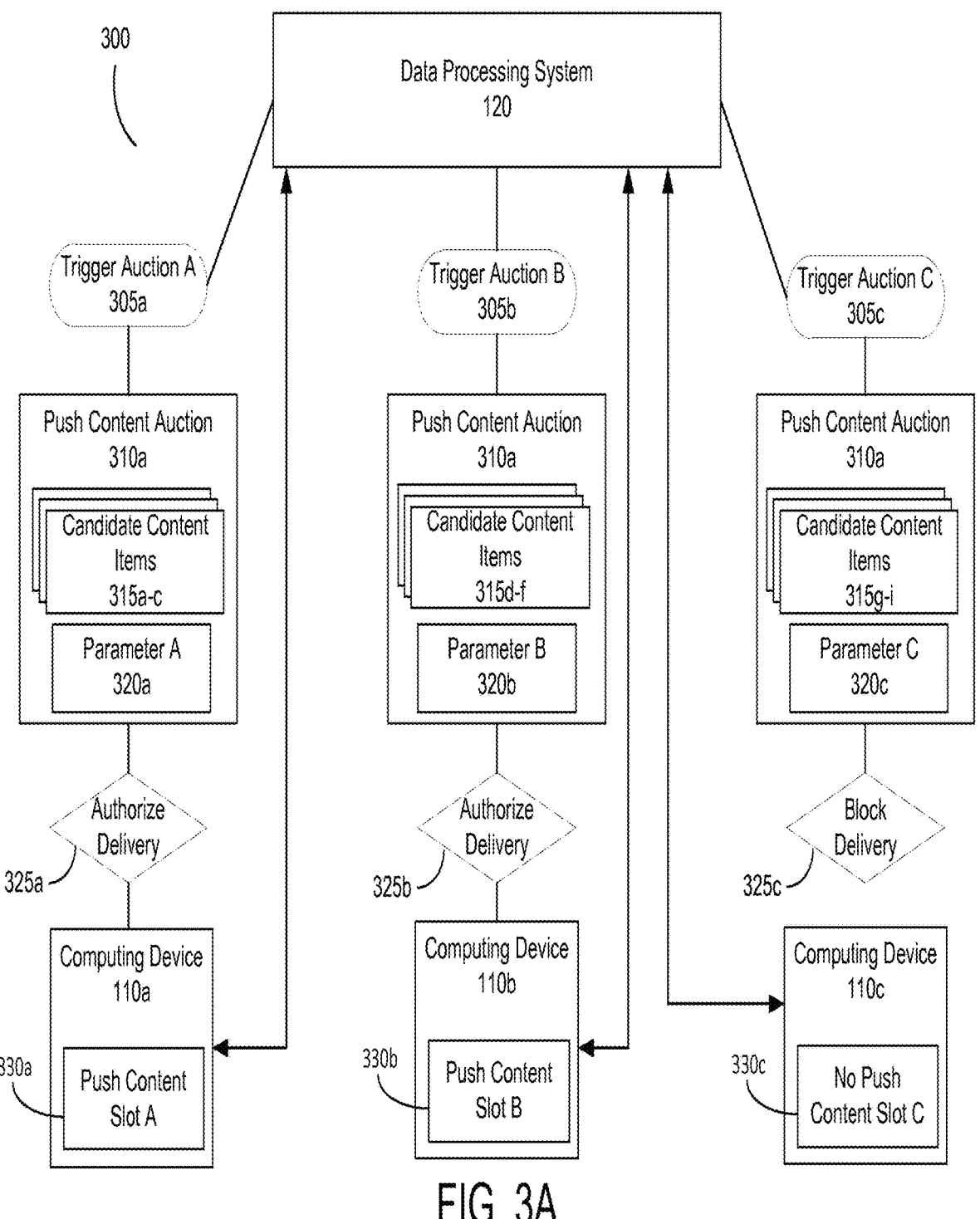
FIG. 3A depicts a functional diagram for providing content items via a push marketing auction in accordance with an implementation.

Referring now to FIG. 3A, an operational block diagram of providing content items in accordance with an illustrative implementation is shown. The system 300 includes a data processing system 120 that triggers a separate auction for each computing device. For example, the data processing system 120 may attempt to provide push content items to a first computing device 110*a*, a second computing device 110*b*, and a third computing device 110*c*. Each of the computing devices 110*a-c* may correspond to a different account identifier. For example, the computing device 110*a* may be configured with a first account identifier via an application, resource or operating system executing on the first computing device 110*a*; the computing device 110*a* may be configured with a second account identifier via an application, resource or operating system executing on the second computing device 110*b*; and the third computing device 110*c* may be configured with a third account identifier via an application, resource or operating system executing on the third computing device 110*c*.

The data processing system 120 can trigger a separate push auction 305 for each computing device. For example, the data processing system 120 can trigger a first push auction A 305*a* for the first computing device 110*a*; a second push auction B 305*b* for the second computing device 110*b*; and a third push auction C 305*c* for the third computing device 110*c*. The data processing system 120 can automatically generate a request to trigger, initiate, or establish the push auctions.

In some implementations, the data processing system 120 can trigger the push auction responsive to detection of a condition, event, or based on one or more parameters satisfying a condition or threshold. For example, the data processing system 120 may trigger a push auction for an account identifier responsive to determining that a general likelihood of engagement for the account identifier is greater than a threshold during a time interval of 8 AM to 9 AM when the determined mode of transportation for the computing device is bus or train. In some implementations, the data processing system 120 may not receive or use real-time data regarding activity of the computing device to trigger the push auction; instead, the data processing system 120 may generate an offline model based on historic information (e.g., historic location information, computing device motion information, etc.) to predict that the computing device is likely on a bus or train from a home location to a work location between 8 AM to 9 AM. Thus, the detection of this condition may trigger the push auction for a particular account identifier.

In some implementations, the data processing system 120 can detect that the computing device (e.g., via receiving an indication from push content agent 170) is on a train or bus and, responsive to the detection, trigger the push auction. A mode of transportation can be determined based on location information, motion information (e.g., following a bus line or train line path), beacons or WIFI routers or cell tower signals configured with identifying information located on the bus or train, etc.

The data processing system 120 can establish, responsive to the request or trigger, a separate push content auction 310a-c for each computing device. Each push content auction 310a-c includes candidate content items. For example, push content auction 310a includes candidate content items 315a-c; push content auction 310b includes candidate content items 315d-f; and push content auction 310c includes candidate content items 315g-i. In some implementations, the push content auction can determine an auction score for each candidate push content item using a parameter (e.g., parameter A 320a, parameter B 320b and parameter C 320c), features, criteria, bid amounts, relevancy scores, quality scores, etc. The parameters may include, e.g., a likelihood of engagement for the account identifier, location information, topics of interest, or other information that can facilitate identifying a highest ranked push content item via the auction.

The data processing system 120 can determine whether to authorize the highest ranked push content item for delivery at decision blocks 325a-c. For example, for each computing device 110a or each account identifier linked to the computing device 110a, the data processing system 120 can apply, use or execute a delivery control policy. The delivery control policy can use parameters specific to the account identifier. For example, the delivery control policy can authorize delivery of the selected push content item based on a number of push content items previously delivered to the account identifier during a time interval. Thus, the delivery control agent can conserve the battery or power source of a computing device, computing resources of the computing device, screen space, network data usage, or network bandwidth by control which push content items are approved or authorized for delivery, there by not sending or reducing the amount of indiscriminate push content items that are sent.

Responsive to authorizing a push content item for delivery, the data processing system 120 can provide the selected push content item for presentation via a push content slot of the computing device. For example, the data processing system 120 can authorize delivery 325a for the first computing device 110a and provide the selected push content item for presentation via push content slot A 330a. In some implementations, the push content item can include an e-mail message, and the data processing system 120 can provide the e-mail message to an e-mail server that provides the e-mail message to the computing device 110a. The data processing system 120 can authorize delivery 325b for the second computing device 110b and provide the selected push content item for presentation via push content slot B 330b. In some implementations, the push content item can include a text message, and the data processing system 120 can provide the text message to a telecommunications service provider that provides the text message to the computing device 110b. The data processing system 120 can determine, using the delivery control policy, to not authorize or block or prevent delivery 325c of a selected push content item for the third computing device 110c. For example, the data processing system 120 can determine, via the delivery control policy, that there is no push content slot C or no push content opportunity.

Figure 3B:
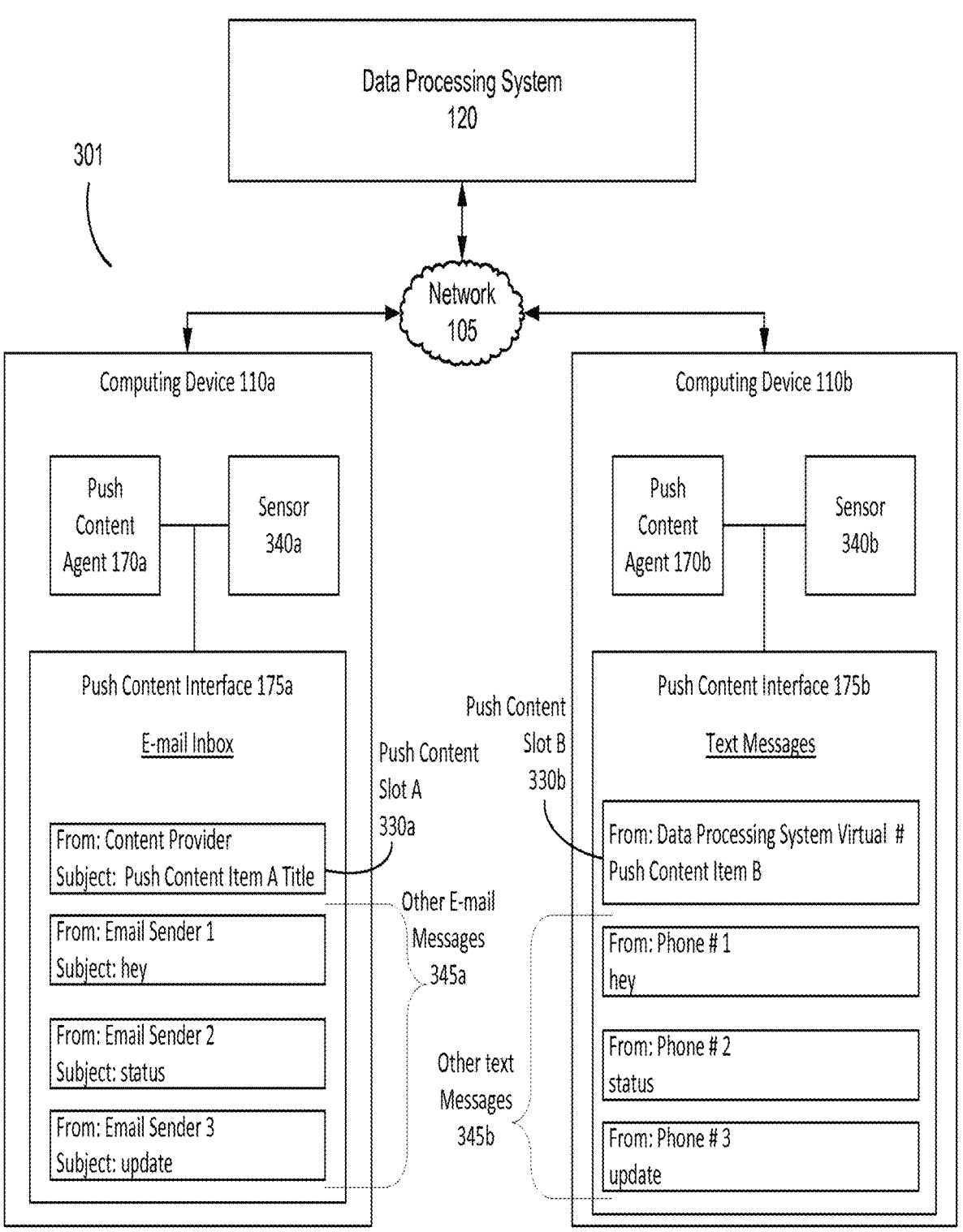
FIG. 3B depicts a functional diagram for providing content items via a push marketing auction in accordance with an implementation.

Referring now to FIG. 3B, an operational block diagram of providing content items in accordance with an illustrative implementation is shown. The system 301 includes the data processing system 120 providing selected and authorized push content items to the first computing device 110a and the second computing device 110b via network 105. The data processing system 120 can provide the selected and authorized push content items via an intermediary server (e.g., an e-mail server, telecommunications service providers, or provider of an application or resource of the computing device configured to receive the push content item).

In some implementations, the computing devices 110a-b can include a push content agent 170a-b and sensor 340a-b. In some implementations, the computing devices 110a-b may not include push content agents. In some implementations, the push content agent 170 can facilitate determining location information of the computing device, mode of transportation information of the computing device, network activity of the computing device, browsing activity of the computing device, etc. In some implementations, the push content agent can interface with a sensor of the computing device to determine or generate this information. The sensors 340a-b can include, e.g., a GPS sensor, accelerometer, gyroscope, ambient temperature sensor, ambient light sensor, motion sensor, audio sensor, altimeter, pressure sensor, etc. For example, the push content agent 170a can correlate engagement activity with sensor information to facilitate the data processing system 120 determining a likelihood of engagement for the account identifier.

The data processing system 120 can provide a push content item for presentation via a push content item interface 175a-b. For example, push content interface 175a can includes an e-mail inbox 175a. An application or resource executed by the computing device 110a can provide the e-mail inbox interface 175a. The data processing system 120 can transmit the push content item to an e-mail address linked to the account identifier. A corresponding e-mail server can receive the push content item sent via e-mail, and transmit the e-mail message for display via the e-mail inbox interface. The push content item can be displayed in push content item A slot 330a, which corresponds to an e-mail message, along with other e-mail messages 345a. The computing device 110a can provide an alert, prompt or notification responsive to receiving the e-mail message comprising push content item A in push content slot A 330a, and a user may access, view, interact with, or otherwise engage with the push content item presented via the push content slot A 330a.

The data processing system 120 can also provide a push content item for presentation via a push content item interface 175b. For example, push content interface 175b can includes an text messaging application having a push content interface 175 executed by computing device 110b. An application or resource executed by the computing device 110b can provide the text messaging interface 175b. The data processing system 120 can transmit the push content item to a phone number linked to an account identifier of computing device 110b. A corresponding text messaging server or telecommunications service provider can receive the push content item sent via text message from the data processing system 120, and transmit the text message for display via the text messaging interface. The push content item can be displayed in push content item B slot 330b, which corresponds to text message, along with other text messages 345*b*. The computing device 110*b* can provide an alert, prompt or notification responsive to receiving the text message comprising push content item B for presentation in push content slot B 330*b*, and a user may access, view, interact with, or otherwise engage with the push content item presented via the push content slot B 330*b*.

Figure 4:
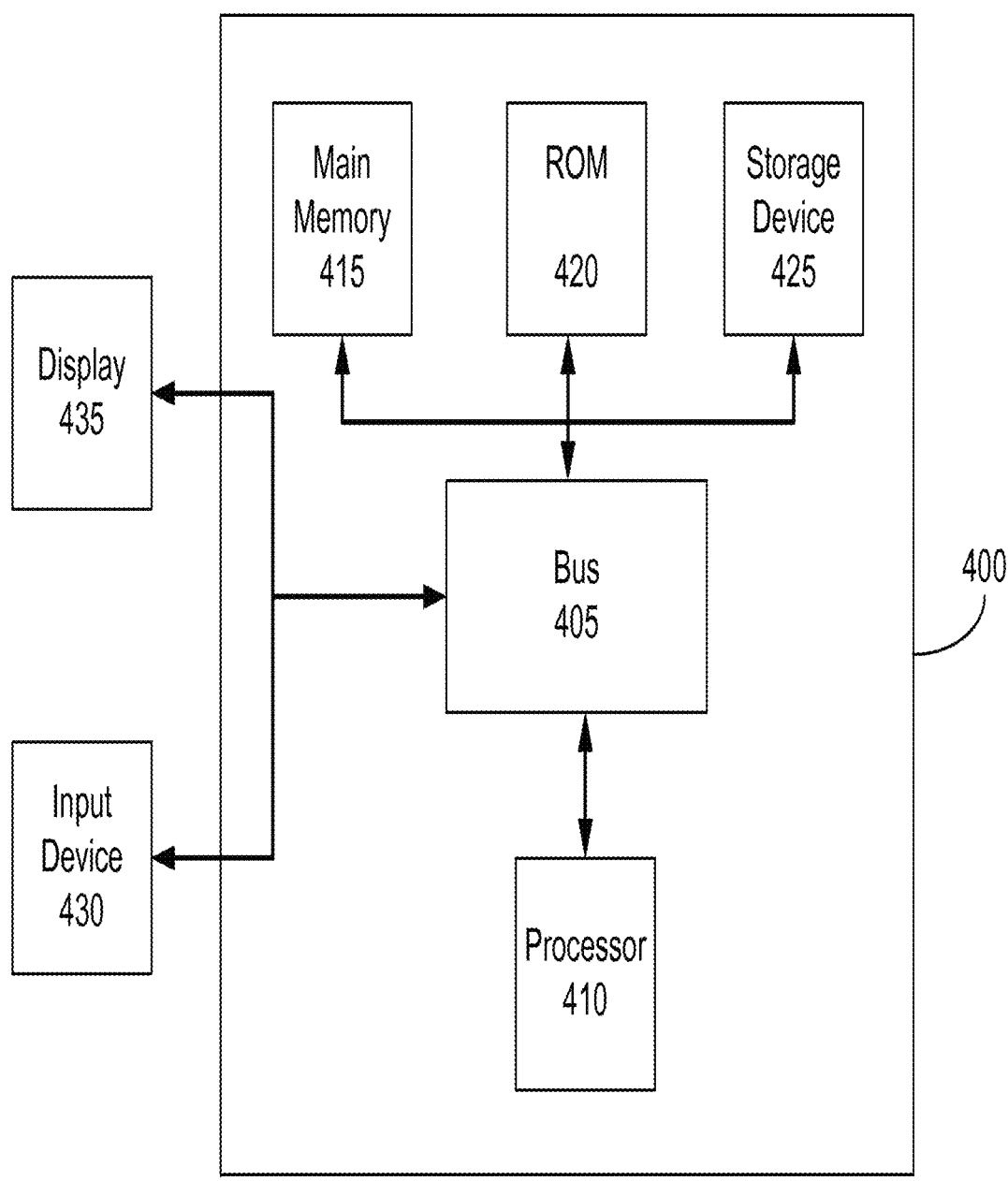
FIG. 4 is a block diagram illustrating a general architecture for a computer system that may be employed to implement various elements of the system shown in FIG. 1, and the method shown in FIG. 2, and the block diagrams shown in FIGS. 3A and 3B among others, in accordance with an implementation.

Referring now to FIG. 4, a block diagram of a computer system 400 in accordance with an illustrative implementation is shown. The computer system or computing device 400 can be used to implement the system 100, system 300, system 301, content provider 125, computing device 110, content publisher 115, data processing system 120, push trigger 130, content selector 135, delivery control agent 140, data repository 145, push content agent 170, and push content interface 175. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, comprising:

determining, by a data processing system, a threshold value for a maximum number of push content items to be delivered to a computing device during a predetermined time interval based on one or more of: a likelihood of engagement associated with a push content item; a mode of delivery associated with the push content item; a time of day; whether a location associated with the computing device is a home location, a work location, or a vacation location;

a distance between the location associated with the computing device and a location associated with a content provider of the push content item; or a mode of transportation associated with the computing device;

determining, by the data processing system, a number of push content items previously delivered to the computing device during the predetermined time interval;

comparing, by the data processing system, the number of push content items previously delivered to the computing device during the predetermined time interval with the threshold value for the maximum number of push content items to be delivered to the computing device to determine whether to authorize or restrict transmission of the push content item to the computing device; and restricting, by the data processing system responsive to comparing the number of push content items previously delivered to the computing device during the predetermined time interval with the threshold value, transmission of the push content item to the computing device during the predetermined time interval, wherein restricting the transmission comprises one or more of denying, rejecting, preventing, or blocking the delivery of the push content item to the computing device.

2. The method of claim 1, wherein the parameter is based on the push content item, the parameter comprising the value to determine whether to authorize or restrict transmission of the push content item.

3. The method of claim 1, further comprising:

periodically receiving, by one or more processors of the data processing system, independent of the computing device requesting content, data from the computing device that provides sensor information via a push content agent executing on the computing device, the push content agent in communication with the data processing system;

establishing, by the data processing system, with the push content agent executing on the computing device, a communication channel via which to receive the sensor information; and wherein periodically receiving the data from the computing device comprises periodically receiving, by the data processing system via the communication channel, the data from the computing device that provides the sensor information via the push content agent executing on the computing device, the push content agent in communication with the data processing system.

4. The method of claim 1, further comprising:

selecting, by the data processing system responsive to the request generated by the data processing system, a second push content item for presentation at the computing device;

determining, by the data processing system, a second value of the parameter used to control delivery of the selected second push content item to the computing device;

comparing, by the data processing system, the second value of the determined parameter with the threshold value to determine whether to authorize or restrict transmission of the selected second push content item to the computing device; and transmitting, by the data processing system responsive to comparing the second value with the threshold value, the selected second push content item to the computing device.

5. The method of claim 1, wherein the computing device is a first computing device, and wherein the method further comprises:

determining, by the data processing system, a second parameter used to control delivery of the push content item to the second computing device;

comparing, by the data processing system, a second value of the determined second parameter with a second threshold value to determine whether to authorize or restrict transmission of the push content item to the second computing device; and transmitting, by the data processing system responsive to comparing the second value of the determined second parameter with the second threshold value, the push content item to the second computing device.

6. The method of claim 1, further comprising determining, by the data processing system, a likelihood of engagement of the push content item based on at least one of historical content engagement activity of the computing device, time, location, account profile information, type of communication channel or mode of communication, activity, or device type of the computing device.

7. The method of claim 1, further comprising:

initiating, by the data processing system, an auction to bid on a likelihood of engagement of the push content item for transmission to the computing device;

determining, by the data processing system, a score based on the auction of the likelihood of engagement;

wherein restricting the transmission of the push content item comprises restricting, by the data processing system responsive to the comparison and based on the score, the transmission of the push content item to the computing device.

8. The method of claim 1, wherein determining, by the data processing system, the threshold value for the maximum number of push content items to be delivered to the computing device during the predetermined time interval is further based on a historical model.

9. The method of claim 1, further comprising:

retrieving, by the data processing system from a database in memory, a delivery control policy specifying a time window indicating a first time and a second time during which push content is authorized for transmission;

authorizing, by the data processing system, the push content item for transmission responsive to a comparison of a time stamp corresponding to the request generated by the push trigger and the time window; and providing, by the data processing system, the push content item for presentation responsive to the authorization.

10. A system, comprising:

a data processing system comprising one or more processor and memory, the data processing system configured to:

determine a threshold value for a maximum number of push content items to be delivered to a computing device during a predetermined time interval based on one or more of: a likelihood of engagement associated with a push content item; a mode of delivery associated with the push content item; a time of day; whether a location associated with the computing device is a home location, a work location, or a vacation location; a distance between the location associated with the computing device and a location associated with a content provider of the push content item; or a mode of transportation associated with the computing device;

determine a number of push content items previously delivered to the computing device during the predetermined time interval;

compare the number of push content items previously delivered to the computing device during the predetermined time interval with the threshold value for the maximum number of push content items to be delivered to the computing device to determine whether to authorize or restrict transmission of the push content item to the computing device; and restrict, responsive to comparing the number of push content items previously delivered to the computing device during the predetermined time interval with the threshold value, transmission of the push content item to the computing device during the predetermined time interval, wherein restricting the transmission comprises one or more of denying, rejecting, preventing, or blocking the delivery of the push content item to the computing device.

11. The system of claim 10, wherein the parameter is based on the push content item, the parameter comprising the value to determine whether to authorize or restrict transmission of the push content item.

12. The system of claim 10, wherein the data processing system is further configured to:

periodically receive, independent of the computing device requesting content, data from the computing device that provides sensor information via a push content agent executing on the computing device, the push content agent in communication with the data processing system;

establish, with the push content agent executing on the computing device, a communication channel via which to receive the sensor information; and wherein periodically receiving the data from the computing device comprises periodically receiving, by the data processing system via the communication channel, the data from the computing device that provides the sensor information via the push content agent executing on the computing device, the push content agent in communication with the data processing system.

13. The system of claim 10, wherein the data processing system is further configured to:

select, responsive to the request generated by the data processing system, a second push content item for presentation at the computing device;

determine a second value of the parameter used to control delivery of the selected second push content item to the computing device;

compare the second value of the determined parameter with the threshold value to determine whether to authorize or restrict transmission of the selected second push content item to the computing device; and transmit, responsive to comparing the second value with the threshold value, the selected second push content item to the computing device.

14. The system of claim 10, wherein the computing device is a first computing device, and wherein the data processing system is further configured to:

determine, a second parameter used to control delivery of the push content item to a second computing device;

compare a second value of the determined second parameter with a second threshold value to determine whether to authorize or restrict transmission of the push content item to the second computing device; and transmit, responsive to comparing the second value of the determined second parameter with the second threshold value, the push content item to the second computing device.

15. The system of claim 10, wherein the data processing system is further configured to determine a likelihood of engagement of the push content item based on at least one of historical content engagement activity of the computing device, time, location, account profile information, type of communication channel or mode of communication, activity, or device type of the computing device.

16. The system of claim 10, wherein the data processing system is further configured to:

initiate an auction to bid on a likelihood of engagement of the push content item for transmission to the computing device;

determine a score based on the auction of the likelihood of engagement;

wherein to restrict the transmission of the push content item comprises restrict, responsive to the comparison and based on the score, the transmission of the push content item to the computing device.

17. The system of claim 10, wherein the data processing system is further configured to determine the threshold value for the maximum number of push content items to be delivered to the computing device during the predetermined time interval further based on a historical model.

18. The system of claim 10, wherein the data processing system is further configured to:

retrieve, from a database in memory, a delivery control policy specifying a time window indicating a first time and a second time during which push content is authorized for transmission;

authorize the push content item for transmission responsive to a comparison of a time stamp corresponding to the request generated by the push trigger and the time window; and provide the push content item for presentation responsive to the authorization.

* * * * *